United States Patent
Ogawa et al.

(10) Patent No.: US 8,268,496 B2
(45) Date of Patent: Sep. 18, 2012

(54) FUEL CELL SYSTEM AND CONTROL METHOD THEREOF

(75) Inventors: Jumpei Ogawa, Saitama (JP); Chihiro Wake, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 835 days.

(21) Appl. No.: 12/276,831

(22) Filed: Nov. 24, 2008

(65) Prior Publication Data

US 2009/0136791 A1 May 28, 2009

(30) Foreign Application Priority Data

Nov. 26, 2007 (JP) .................................. 2007-304498

(51) Int. Cl.
*H01M 8/04* (2006.01)
(52) U.S. Cl. ......... 429/431; 429/428; 429/429; 429/430
(58) Field of Classification Search ........... 429/428–432
See application file for complete search history.

(56) References Cited

U.S. PATENT DOCUMENTS

2006/0040158 A1* 2/2006 Numata et al. .................. 429/34
2007/0059569 A1* 3/2007 Matsumoto et al. ............ 429/22

FOREIGN PATENT DOCUMENTS

| JP | 2004-172026 |   | 6/2004 |
|----|-------------|---|--------|
| JP | 2005-44795  |   | 2/2005 |
| JP | 2005044795  | * | 2/2005 |
| JP | 2006-31998  |   | 2/2006 |
| JP | 2007-220355 |   | 8/2007 |
| JP | 2007220355  | * | 8/2007 |
| JP | 2007-234387 |   | 9/2007 |

OTHER PUBLICATIONS

Decision to Grant a Patent for Application No. 2007-304498, dated Jan. 19, 2010.

* cited by examiner

*Primary Examiner* — Ula C Ruddock
*Assistant Examiner* — Patricia Davis
(74) *Attorney, Agent, or Firm* — Nelson Mullins Riley & Scarborough LLP; Anthony A. Laurentano

(57) ABSTRACT

An object of the present invention is to provide a fuel cell system capable of starting below freezing point without increasing the size of the diluter. The fuel cell system 1 comprises an OCV purge execution unit 42 replacing gas retained in a fuel cell 10 by supplying additional anode gas from a supply device 20 to the fuel cell 10 when starting up the fuel cell. In addition, the fuel cell system 1 comprises a low temperature startup determination unit 41 determining whether to perform low temperature startup or normal startup on the fuel cell 10. The OCV purge execution unit 42 decreases the pressure of additional anode gas supplied from the supply device 20 and increases the total replacing amount of gas retained in the fuel cell 10 in a case of performing low temperature startup, as compared with a case of performing normal startup.

2 Claims, 5 Drawing Sheets

FUEL CELL SYSTEM AND CONTROL METHOD THEREOF

This application is based on and claims the benefit of priority from Japanese Patent Application No. 2007-304498, filed on 26 Nov. 2007, the content of which is incorporated herein by reference.

BACKGROUND OF THE INVENTION

1. Field of the Invention

The present invention relates to a fuel cell system. Specifically, the present invention relates to a fuel cell system in which the total replacing amount of gas during the OCV purge increases during low temperature startup, as compared with during normal startup.

2. Related Art

In recent years, fuel cell systems have gained the spotlight as a new power source for automobiles. For example, a fuel cell system is provided with a fuel cell producing electric power from chemical reactions of reactive gas, a reactive gas supply device supplying the reactive gas to the fuel cell through a reactive gas channel, and a control device controlling the reactive gas supply device.

For example, the fuel cell consists of a plurality, e.g., tens or hundreds, of stacked cells. Each of the cells consists of a pair of separators sandwiching a membrane electrode assembly (MEA) which consists of two electrodes, an anode (positive electrode) and a cathode (negative electrode), and a solid polymer electrolyte membrane sandwiched by these electrodes.

Supplying anode gas to the anode and cathode gas to the cathode causes an electrochemical reaction by which the fuel cell generates electric power. For example, hydrogen gas and air containing oxygen are used for the anode gas and the cathode gas, respectively. Since only water, which is essentially harmless to the environment, is produced during electric power generation, the fuel cell has garnered attention from the viewpoint of environmental impact and usage efficiency.

In such a fuel cell system, a condition in which electric power generation is stopped by stopping the supply of anode gas and cathode gas causes a differential pressure between both electrodes, so that impurities contained in the cathode gas diffuse to the anode side, whereby the concentration of anode gas in the anode channel decreases. Accordingly, when the fuel cell system starts, so-called OCV purge processing, in which additional anode gas is supplied to replace gas retained in the anode electrode side of the fuel cell, is conducted in order to ensure power generation performance of the fuel cell.

However, residual water in the fuel cell may freeze at a membrane electrode, whereby the effective power generation area decreases upon low temperature start. This could lead to difficulty in starting the fuel cell system. Thus, Unexamined Japanese Patent Application, First Publication No. 2005-44795 discloses a fuel cell system in which the supply pressure and the flow of anode gas during OCV purge processing increase upon low temperature start, as compared with upon normal temperature start. The supply pressure and the flow of anode gas increases as described above, so that the power generation performance of the fuel cell can be ensured to be prompt by effectively using a smaller reactive area than that upon normal temperature start.

SUMMARY OF THE INVENTION

By the way, anode off-gas discharged from the fuel cell is diluted with cathode gas and cathode off-gas, etc., and then exhausted outside of the fuel cell system. Accordingly, the fuel cell system is provided with a diluter having a retention chamber to retain anode off-gas temporarily.

However, in the fuel cell system disclosed in the above-mentioned patent application, the supply pressure and the flow of anode gas increase upon low temperature start, whereby an extremely large amount of anode off-gas is exhausted in a short time. This requires increasing the size of the diluter according to the exhaust amount of anode off-gas upon low temperature start.

An object of the present invention is to provide a fuel cell system capable of low temperature startup without increasing the size of a diluter diluting anode off-gas.

The fuel cell system of the present invention (for example, a fuel cell system 1 described later) includes: a fuel cell (for example, a fuel cell 10 described later) generating electric power by chemically reacting cathode gas (for example, air described later) with anode gas (for example, hydrogen gas described later); a cathode gas supply means (for example, an air compressor 21, an air supply channel 23, etc. described later) for supplying cathode gas to the fuel cell; an anode gas supply means (for example, a hydrogen tank 22, a hydrogen supply channel 25, a hydrogen regulator 251, etc. described later) for supplying anode gas to the fuel cell; an anode gas replacing means (for example, an OCV purge execution unit 42 of a controller 40 described later) for replacing gas retained in the fuel cell by supplying additional anode gas from the anode gas supply means to the fuel cell when starting up the fuel cell; and a low temperature startup determination means (for example, a low temperature startup determination unit 41 of a controller 40 described later) for determining whether to perform low temperature startup or to perform normal startup on the fuel cell based on information regarding the temperature of the fuel cell (for example, the temperature T of the fuel cell detected by a fuel cell temperature sensor 11, the system temperature of the fuel cell system 1, the outside air temperature of the fuel cell system 1, and a weather forecast, etc. described later), in which the anode gas replacing means decreases the pressure of additional anode gas to be supplied from the anode gas supply means, and increases the total replacing amount of gas retained in the fuel cell in a case of performing low temperature startup on the fuel cell, as compared with a case of performing normal startup on the fuel cell.

According to the present invention, in the case of performing low temperature startup on the fuel cell, the pressure of additional anode gas to be supplied from the anode gas supply means to the fuel cell decreases, and the total replacing amount of gas retained in the fuel cell increases, as compared with the case of performing normal startup. In this way, the total replacing amount of gas increases in the case of performing low temperature startup on the fuel cell, as compared with the case of performing normal startup. This makes it possible to ensure power generation performance of the fuel cell by using a reactive area effectively, for example, even if residual water freezes in the fuel cell, thereby decreasing the effective power generation area.

In addition, it is possible to reduce the amount of anode off-gas to be exhausted per a unit time increasing the total replacing amount of gas, and decreasing the pressure of anode gas as described above. Accordingly, for the fuel cell system with the diluter, it is no longer necessary to increase the size of the diluter according to the exhaust amount of anode off-gas during low temperature startup.

In this case, it is preferable that the fuel cell system of the present invention further includes: a dilution means (for example, a diluter 50 described later) for diluting gas and then exhausting thereof by using gas containing at least one of cathode off-gas discharged from the fuel cell and cathode gas supplied from the cathode gas supply means as dilution gas; and an introduced gas pressure reduction means (for example, an agitation gas pressure adjusting unit 43 of a controller 40 described later), in which the dilution means has a retention chamber (for example, a retention chamber 53 described later) temporarily retaining anode off-gas discharged from the fuel cell, an inlet pipe (for example, an agitation gas inlet pipe 56 described later) introducing dilution gas into the retention chamber, and a dilution gas pipe (for example, a dilution gas pipe 57 described later) in which dilution gas circulates and a hole part (for example, a hole part 571 described later) is formed for intaking retained gas in the retention chamber, and the introduced gas pressure reduction means reduces the pressure of the dilution gas to be introduced from the inlet pipe to the retention chamber in a case of performing low temperature startup on the fuel cell, as compared with a case of performing normal startup, while gas retained in the fuel cell is replaced by the anode gas replacing means.

According to the present invention, the fuel cell system is provided with the dilution means having the retention chamber in which anode off-gas is temporarily retained, the inlet pipe introducing dilution gas into the retention chamber, and the dilution gas pipe in which dilution gas circulates and the hole part intaking retained gas in the retention chamber is formed.

This dilution means operates as follows. First, the dilution means introduces anode off-gas into the retention chamber, and then mixes and dilutes anode off-gas therein while dilution gas is introduced thereinto through the inlet pipe. Second, anode off-gas diluted as described above is evacuated from the retention chamber by additional dilution gas introduced from the inlet pipe, flows into the dilution gas pipe through the hole part, and then is exhausted together with dilution gas circulating in this dilution gas pipe.

Accordingly, the pressure of dilution gas to be introduced from the inlet pipe to the retention chamber decreases in the case of performing low temperature startup on the fuel cell, as compared with the case of performing normal startup. This leads to a reduction in the flow per unit time of anode off-gas to be evacuated from the retention chamber to the dilution gas pipe or the concentration of anode off-gas in gas to be exhausted from the dilution means.

In addition, the pressure in the retention chamber can be reduced by reducing the pressure of dilution gas to be introduced into the retention chamber through the inlet pipe. As described above, the pressure of additional anode gas to be supplied decreases in the case of performing low temperature startup on the fuel cell, as compared with the case of performing normal startup. Reducing the pressure of anode gas in this way may cause difficulty in introducing anode off-gas discharged from the fuel cell into the retention chamber. However, in the present invention, anode off-gas can be introduced into the retention chamber by reducing the pressure in the retention chamber, even if the pressure of additional anode gas to be supplied decreases. Accordingly, reducing the supply pressure of anode gas during low temperature startup can prevent the performance of the diluter diluting anode off-gas from deteriorating.

In addition, electric power to be consumed by a means for supplying this dilution gas, such as the cathode gas supply means for supplying cathode gas, can be reduced by reducing the pressure of the dilution gas. Especially, since such replacing of anode gas is conducted when starting up the fuel cell, or before the fuel cell begins electric power generation, the electric power to be consumed by the cathode gas supply means is supplied from a battery. Thus, according to the present invention, by suppressing consumption of battery power, unconsumed battery power can be used as electric power energy for operating other accessories such as an air conditioner and the like, and also a smaller and cheaper battery can be used.

The fuel cell system of the present invention (for example, a fuel cell system 1 described later) includes: a fuel cell (for example, a fuel cell 10 described later) generating electric power by chemically reacting cathode gas (for example, air described later) with anode gas (for example, hydrogen gas described later); a cathode gas supply means (for example, an air compressor 21, an air supply channel 23, etc. described later) for supplying cathode gas to the fuel cell; an anode gas supply means (for example, a hydrogen tank 22, a hydrogen supply channel 25, a hydrogen regulator 251, etc. described later) for supplying anode gas to the fuel cell; an anode gas replacing means (for example, an OCV purge execution unit 42 of a controller 40 described later) for replacing gas retained in the fuel cell by supplying additional anode gas from the anode gas supply means to the fuel cell when starting up the fuel cell; a low temperature startup determination means (for example, a low temperature startup determination unit 41 of a controller 40 described later) for determining whether to perform low temperature startup or normal startup on the fuel cell based on information regarding the temperature of the fuel cell (for example, the temperature T of the fuel cell detected by a fuel cell temperature sensor 11, the system temperature of the fuel cell system 1, and the outside air temperature of the fuel cell system 1, etc. described later); a dilution means (for example, a diluter 50 described later) for diluting gas and then exhausting thereof by using the gas containing at least one of cathode off-gas discharged from the fuel cell and cathode gas supplied from the cathode gas supply means as dilution gas; and an introduced gas pressure reduction means (for example, an agitation gas pressure adjusting unit 43 of a controller 40 described later), in which the dilution means has a retention chamber (for example, a retention chamber 53 described later) temporarily retaining anode off-gas discharged from the fuel cell, an inlet pipe (for example, an agitation gas inlet pipe 56 described later) introducing dilution gas into the retention chamber, and a dilution gas pipe (for example, a dilution gas pipe 57 described later) in which dilution gas circulates and a hole part (for example, a hole part 571 described later) is formed for intaking retained gas in the retention chamber, and the introduced gas pressure reduction means reduces the pressure of the dilution gas to be introduced from the inlet pipe to the retention chamber in a case of performing low temperature startup on the fuel cell, as compared with a case of performing normal startup on the fuel cell, while gas retained in the fuel cell is replaced by the anode gas replacing means.

According to the present invention, the fuel cell system is provided with the dilution means having the retention chamber in which anode off-gas is temporarily retained, the inlet pipe introducing dilution gas into the retention chamber, and the dilution gas pipe in which dilution gas circulates and the hole part intaking retained gas in the retention chamber is formed.

This dilution means operates as follows. First, the dilution means introduces anode off-gas into the retention chamber, and then mixes and dilutes anode off-gas therein while dilution gas is introduced thereinto through the inlet pipe. Second, anode off-gas diluted as described above is evacuated from the retention chamber by additional dilution gas introduced from the inlet pipe, flows into the dilution gas pipe through the hole part, and then is exhausted together with dilution gas circulating in this dilution gas pipe.

Accordingly, the pressure of dilution gas to be introduced from the inlet pipe to the retention chamber decreases in the case of performing low temperature startup on the fuel cell, as compared with the case of performing normal startup. This leads to a reduction in the flow per unit time of anode off-gas to be evacuated from the retention chamber to the dilution gas pipe or the concentration of anode off-gas in gas to be exhausted from the dilution means. Accordingly, the total replacing amount of gas can be increased by replacing gas retained in the fuel cell for a longer time, as compared with the case of performing normal startup. This makes it possible to ensure power generation performance of the fuel cell by using a reactive area effectively, for example, even if residual water freezes in the fuel cell, thereby decreasing the effective power generation area.

In addition, electric power to be consumed by a means supplying this dilution gas, which is the cathode gas supply means supplying cathode gas, can be reduced by reducing the pressure of dilution gas. Especially, since such replacing of anode gas is conducted when starting up the fuel cell, or before the fuel cell begins electric power generation, the electric power to be consumed by the cathode gas supply means is supplied from a battery. Thus, according to the present invention, by suppressing consumption of battery power, unconsumed battery power can be used as electric power energy for operating other accessories such as an air conditioner and the like, and also a smaller and cheaper battery can be used.

According to the fuel cell system of the present invention, the total replacing amount of gas increases in the case of performing low temperature startup on the fuel cell, as compared with the case of performing normal startup. This makes it possible to ensure power generation performance of the fuel cell by using a reactive area effectively, for example, even if residual water freezes in the fuel cell, thereby decreasing and the effective power generation area. In addition, it is possible to decrease the amount of anode off-gas to be exhausted per a unit time increasing the total replacing amount of gas, and decreasing the pressure of anode gas as described above. Accordingly, for the fuel cell system with the diluter, it is no longer necessary to increase the size of the diluter according to the exhaust amount of anode off-gas during low temperature startup.

DETAILED DESCRIPTION OF THE INVENTION

One embodiment of the present invention is described hereinafter with reference to the accompanying drawings.

Figure 1:
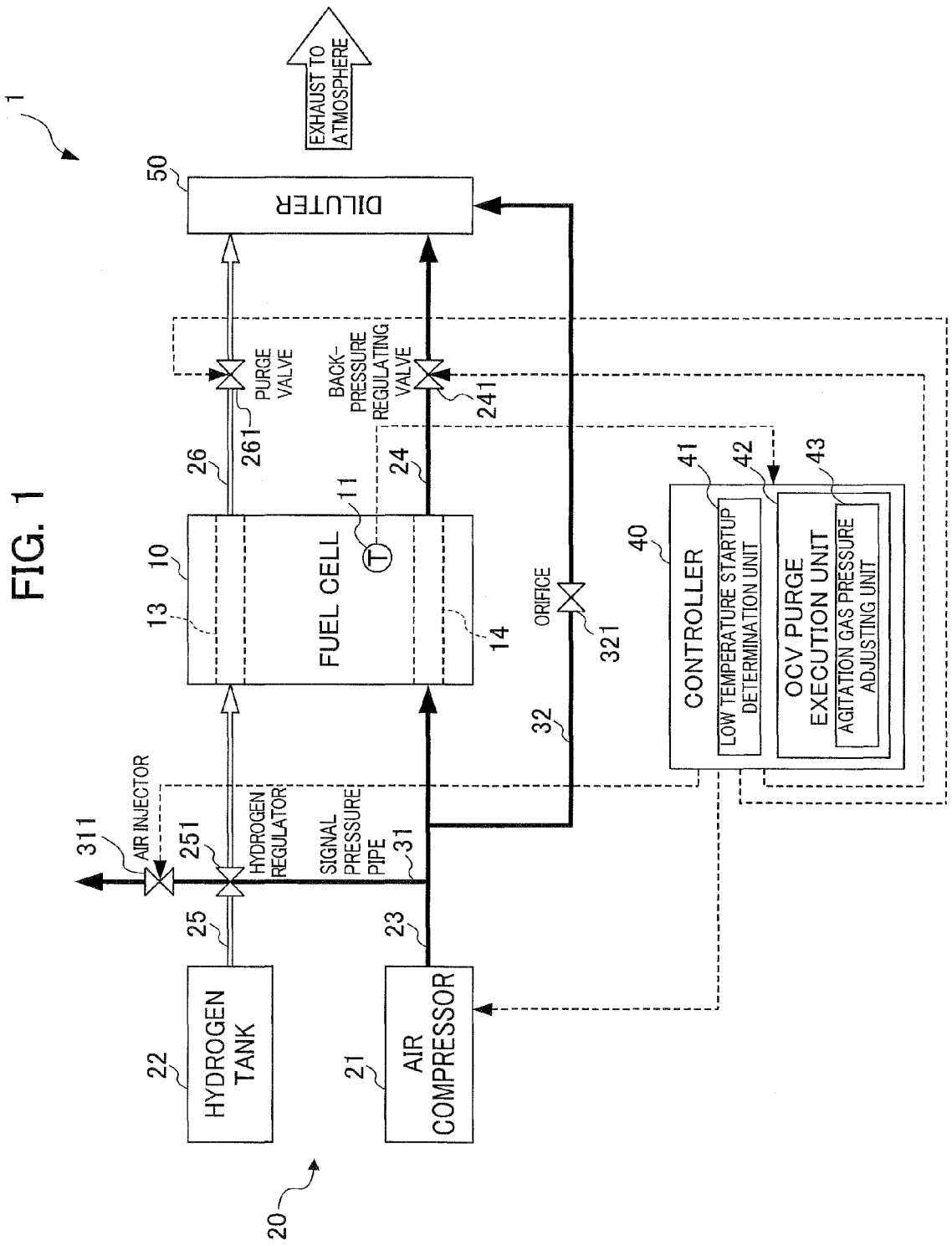
FIG. 1 is a block diagram illustrating a fuel cell system according to one embodiment of the present invention.

FIG. 1 is a schematic diagram of the fuel cell system 1 according to the present embodiment. The fuel cell system 1 has a fuel cell 10, a supply device 20 supplying hydrogen gas (hereinafter referred to as "anode gas") and air (hereinafter referred to as "cathode gas") to the fuel cell 10, and a control device 40 controlling the fuel cell 10 and the supply device 20.

The fuel cell 10 has a stack structure in which tens to hundreds of cells are stacked, for example. Each of the cells has a membrane electrode assembly (MEA) sandwiched by a pair of separators. The MEA is configured with two electrodes, an anode (a positive electrode) and a cathode (a negative electrode), and a solid polymer electrolyte membrane sandwiched between these electrodes. Typically, each of the electrodes consists of a catalyst layer in contact with the solid high-polymer electrolyte membrane performing an oxidation-reduction reaction and a gas diffusion layer in contact with the catalyst layer.

Supplying anode gas to an anode channel 13 formed at an anode side (positive electrode) and cathode gas to a cathode channel 14 formed at a cathode side (negative electrode) causes an electrochemical reaction of these gases by which the fuel cell 10 produces electric power. In addition, the fuel cell 10 is provided with a fuel cell temperature sensor 11 detecting the temperature of the fuel cell 10. This fuel cell temperature sensor 11 detects the temperature of the fuel cell 10, and then outputs a detection signal approximately proportional to the detected temperature T of the fuel cell to the controller 40.

The supply device 20 is configured with an air compressor 21 supplying cathode gas to the cathode channel 14 of the fuel cell 10, and a hydrogen tank 22 supplying anode gas to the anode channel 13 of the fuel cell 10.

The air compressor 21 connects with a first end side of the cathode channel 14 of the fuel cell 10 through an air supply channel 23. A second end side of the cathode channel 14 of the fuel cell 10 connects with an air discharge channel 24 having the top end side connecting with a diluter 50. The air discharge channel 24 is provided with a back-pressure regulating valve 241. Cathode off-gas discharged from the cathode channel 14 of the fuel cell 10 to the air discharge channel 24 can be flowed as a dilution gas into the diluter 50 by opening this back-pressure regulating valve 241. The detailed structure of diluter 50 is described hereinafter with reference to FIG. 2.

In addition, a signal pressure pipe 31 and a by-pass pipe 32 branch from the air supply channel 23.

The signal pressure pipe 31 connects with a hydrogen regulator 251 and has the top end part provided with an air injector 311 ejecting cathode gas from the signal pressure pipe 31. The pressure of cathode gas in the signal pressure pipe 31 can be adjusted by opening and shutting this air injector 311.

The top end side part of the by-pass pipe 32 connects with the diluter 50. In addition, this by-pass pipe 32 is provided with an orifice 321 regulating the flow of cathode gas that circulates in the by-pass pipe 32, and then flows into the diluter 50. In the present invention, instead of this orifice 321, a flow control valve capable of adjusting the flow of cathode gas may be provided.

The hydrogen tank 22 connects with a first end side of the anode channel 13 of the fuel cell 10 through a hydrogen supply channel 25. This hydrogen supply channel 25 is provided with the hydrogen regulator 251 decreasing the pressure of anode gas supplied from the hydrogen tank 22.

The hydrogen regulator 251 is a so-called proportional pressure control valve, and the opening thereof can be controlled by the pressure of cathode gas in the signal pressure pipe 31, which serves as a signal pressure. The opening of the hydrogen regulator 251 increases as the pressure of cathode gas in the signal pressure pipe 31 increases. The pressure of anode gas to be supplied to the fuel cell 10 can be adjusted by controlling the opening of this hydrogen regulator 251.

A second end side of the anode channel 13 of the fuel cell 10 connects with a hydrogen discharge channel 26. The top end side of the hydrogen discharge channel 26 connects with the diluter 50 diluting anode off-gas discharged from the anode channel 13 of the fuel cell 10 to the hydrogen discharge channel 26, and then exhausting anode off-gas to the atmosphere. In addition, the hydrogen discharge channel 26 is provided with a purge valve 261. Anode off-gas in the hydrogen discharge channel 26 can be flowed into the diluter 50 by opening this purge valve 261.

Figure 2:
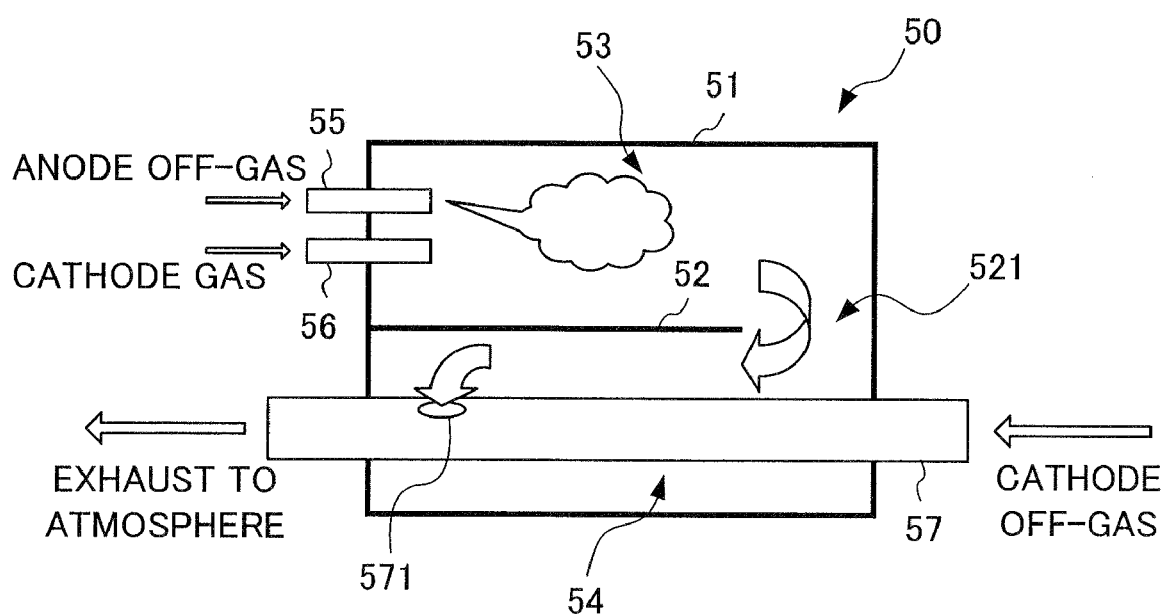
FIG. 2 is a section view illustrating the structure of the diluter according to the abovementioned embodiment.

FIG. 2 is a sectional view illustrating the structure of the diluter 50.

The diluter 50 is provided with an approximate box-shaped housing 51 and a partition plate 52.

The partition plate 52 is provided in the housing 51, thereby dividing thereof into a retention chamber 53 and a mixing chamber 54. In addition, a communication hole part 521 with an approximately rectangular shape, which communicates between the retention chamber 53 and the mixing chamber 54, is formed through the partition plate 52.

The housing 51 is provided with an anode off-gas inlet pipe 55 introducing anode off-gas discharged from the fuel cell to the retention chamber 53 through the hydrogen discharge channel 26 (see FIG. 1), and an agitation gas inlet pipe 56 as the inlet pipe introducing cathode gas supplied from the compressor to the retention chamber 53 through the by-pass pipe 32 (see FIG. 1).

In addition, the housing 51 is provided with a dilution gas pipe 57 penetrating through the mixing chamber 54. The bottom end side of this dilution gas pipe 57 connects with the air discharge channel 24 (see FIG. 1) while the top end side thereof is open to the atmosphere. That is, cathode off-gas discharged from the fuel cell circulates in the dilution gas pipe 57, and then is exhausted to the atmosphere. In addition, a hole part 571, which intakes gas retained in the retention chamber 53 in the dilution gas pipe 57 through the mixing chamber 54, is formed on this dilution gas pipe 57 in the mixing chamber 54.

The diluter 50 configured as described above operates as follows, dilutes anode off-gas, and then exhausts thereof to the atmosphere.

First, the diluter 50 first introduces anode off-gas discharged from the fuel cell into the retention chamber 53, and then mixes and dilutes anode off-gas therein while cathode gas is introduced thereinto through the agitation gas inlet pipe 56. Second, anode off-gas diluted in the retention chamber 53 is pushed out to the mixing chamber 54 through the communication hole part 521.

Anode off-gas pushed out to the mixing chamber 54 flows into the dilution gas pipe 57 through the hole part 571, and then is exhausted to the atmosphere together with cathode off-gas circulating in this dilution gas pipe 57.

Returning to FIG. 1, the controller 40 connects with the air compressor 21, the back-pressure regulating valve 241, the purge valve 261, the air injector 311, and the fuel cell temperature sensor 11.

The control unit 40 also connects with an ignition switch (not shown). This ignition switch is provided at the driver's seat of a vehicle equipped with the fuel cell system 1, and transmits on/off signals to the control unit 40 based on a driver's operation. The control unit 40 beings startup processing of the fuel cell 10 based on turning on of the ignition switch.

The OCV purge processing described thereinafter is executed in this startup processing of the fuel cell 10, and then the fuel cell 10 begins electric power generation after this OCV purge is completed.

Steps of electric power generation by the fuel cell 10 are described below.

First, anode gas is supplied to the anode side of the fuel cell 10 from the hydrogen tank 22 through the hydrogen supply channel 25. In addition, cathode gas is supplied to the cathode side of the fuel cell 10 through the air supply channel 23 by driving the air compressor 21.

Second, anode gas and cathode gas supplied to the fuel cell 10 used to generate electric power, flow from the fuel cell 10 to the diluter 50 through the hydrogen discharge channel 26 and the air discharge channel 24, respectively, together with remaining water such as water produced on the anode side and the like, are diluted in this diluter 50, and then are exhausted to the atmosphere.

The controller 40 is provided with a low temperature startup determination unit 41 as the low temperature startup determination means and an OCV purge execution unit 42 as the anode gas replacing means. The controller 40 conducts the OCV purge processing when starting up the fuel cell 10, and then generates electric power as described above. FIG. 1 shows a control block regarding only the OCV purge processing of the fuel cell 10.

When starting up the fuel cell 10, the low temperature startup determination unit 41 determines whether to perform low temperature startup or normal startup on the fuel cell 10 based on the temperature T of the fuel cell detected by the fuel cell temperature sensor 11. More specifically, the low temperature startup determination unit 41 determines to perform low temperature startup on the fuel cell 10 in a case where the temperature T of the fuel cell is lower than a preset determination temperature (for example, 0 degrees Celsius), and determines to perform normal startup on the fuel cell 10 in a case where the temperature T of the fuel cell is at least the preset determination temperature. This low temperature startup determination unit 41 may determine whether to perform low temperature startup or to perform normal startup based on information such as outside temperature and a weather forecast instead of the temperature T of the fuel cell.

The OCV purge execution unit 42 controls the supply device 20 to execute the OCV purge processing when starting up the fuel cell 10. More specifically, the OCV purge execution unit 42 replaces gas retained in the fuel cell 10 by controlling the air compressor 21, the back-pressure regulating valve 241, the air injector 311, and the purge valve 261 of the supply device 20 to supply additional anode gas to the fuel cell 10 for a predetermined period during startup of the fuel cell 10.

In addition, this OCV purge execution unit 42 changes the pressure of additional anode gas to be supplied to the fuel cell 10 and the total replacing amount of gas retained in the fuel cell 10 according to whether low temperature startup or normal startup is performed on the fuel cell 10.

More specifically, the OCV purge execution unit 42 decreases the pressure of additional anode gas to be supplied and increases the total replacing amount of gas in the case of performing low temperature startup on the fuel cell 10 as compared with the case of performing normal startup on the fuel cell 10.

In addition, this OCV purge execution unit 42 is provided with an agitation gas pressure adjusting unit 43 as the introduced gas pressure reduction means. In the OCV purge processing, the OCV purge execution unit 42 can adjust the pressure of cathode gas to be introduced into the agitation gas inlet pipe 56 of the diluter 50 (see FIG. 2).

During the OCV purge processing, the agitation gas pressure adjusting unit 43 reduces the pressure of cathode gas to be introduced into the agitation gas inlet pipe 56 of the diluter 50 (see FIG. 2) in the case of performing low temperature startup on the fuel cell 10, as compared with the case of performing normal startup on the fuel cell 10.

Figure 3:
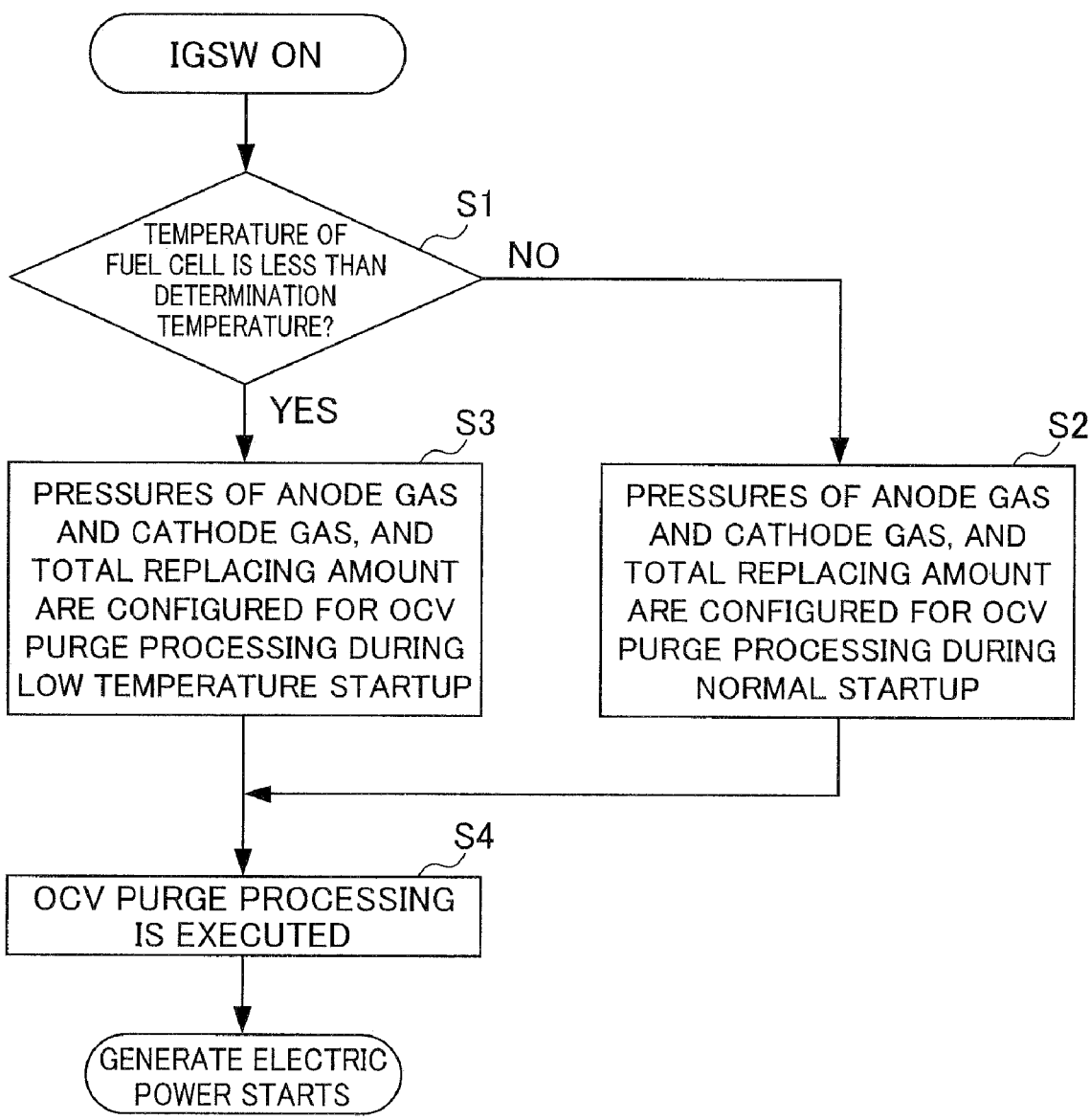
FIG. 3 is a flow chart illustrating the procedure of the OCV purge processing by the controller according to the abovementioned embodiment.

FIG. 3 is a flow chart illustrating the procedure of the OCV purge processing by the abovementioned controller 40. This OCV purge processing starts based on turning on of the ignition switch.

At the beginning, in Step S1, it is determined if the temperature T of the fuel cell is lower than a preset determination temperature. In the case of a "YES" determination, it is determined to perform low temperature startup on the fuel cell, and then advance to Step S3. In the case of a "NO" determination, it is determined to perform normal startup on the fuel cell, and then advance to Step S2.

In Step S2, the settings are configured for the OCV purge processing during normal startup, and then advances to Step S4 to execute the OCV purge processing based on the settings. More specifically, the pressures of anode gas and cathode gas, and the total replacing amounts, which are used for OCV purge processing during normal startup, are configured with reference to a table (not shown).

In Step S3, the settings are configured for the OCV purge processing during low temperature startup, and then advances to Step S4 to execute the OCV purge processing based on the settings. More specifically, the pressures of anode gas and cathode gas, and the total replacing amount, which are used for the OCV purge processing during low temperature startup, are configured with reference to a table (not shown). As described above, in the OCV purge processing during low temperature startup, the pressures of anode gas and cathode gas decrease, and the total replacing amount increases, as compared with during normal startup.

FIG. 4 is a timing diagram of the OCV purge processing during low temperature startup.

Figure 4A:
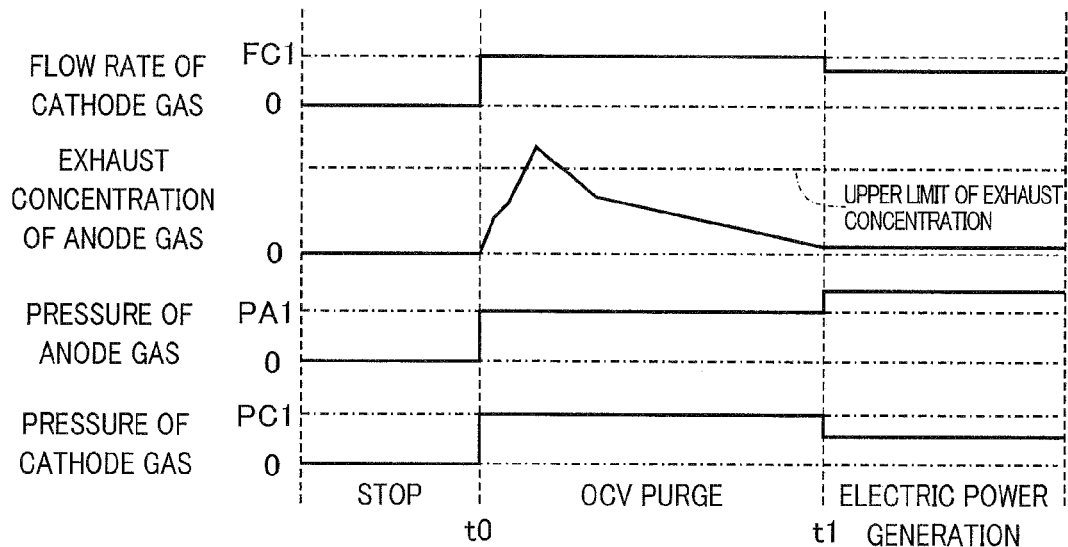
FIG. 4 is a timing diagram of the OCV purge processing during low temperature startup according to the abovementioned embodiment.
Figure 4B:
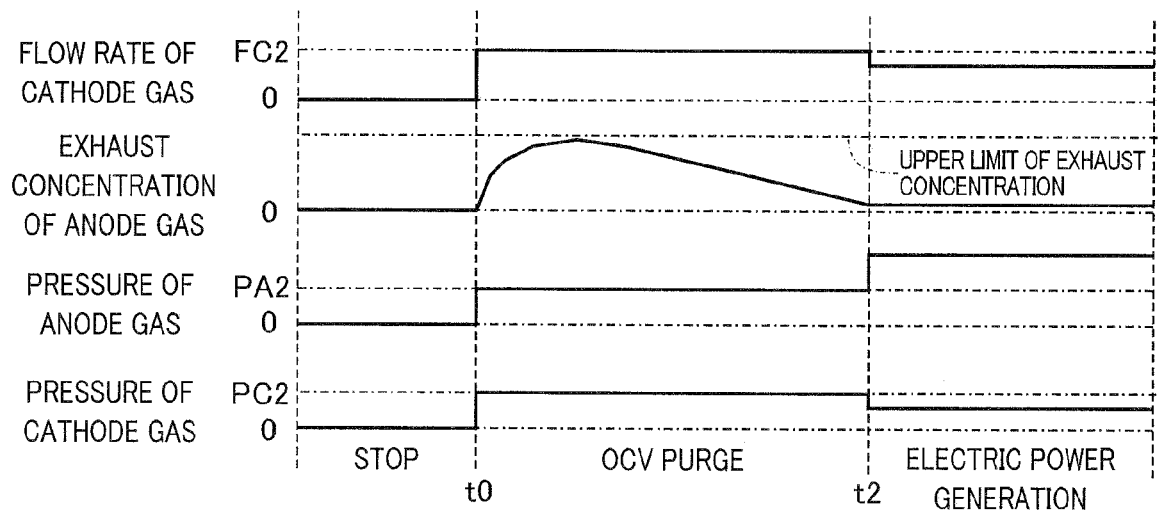

More specifically, FIG. 4A is a timing diagram of the OCV purge processing according to a fuel cell system of a comparative example during low temperature startup, and FIG. 4B is a timing diagram of the OCV purge processing according to the fuel cell system 1 of the present embodiment during low temperature startup.

The pressures of anode gas and cathode gas, which are used in the fuel cell system of the comparative example during low temperature startup, are set to the same values as those during normal startup. That is, the pressures of anode gas and cathode gas used in the fuel cell system of the comparative example during low temperature startup are set to be higher values than those used in the fuel cell system 1 of the present invention. In addition, the total replacing amount used in the fuel cell system of the comparative example during low temperature startup is set to be the same value as that used in the fuel cell system 1 of the present invention.

As shown in FIG. 4A, in the fuel cell system of the comparative example, the OCV purge processing starts at the time t0. That is, anode gas and cathode gas at the predetermined pressures PA1 and PC1, respectively, start to be supplied from the time t0 and at the predetermined flow rate FC1 of cathode gas. This OCV purge processing is conducted until the time t1 when the total replacing amount reaches the predetermined value.

In this comparative example, the concentration of anode off-gas in gas exhausted from the diluter exceeds the predetermined upper limit of the exhaust concentration immediately after OCV purge processing starts.

In contrast, as shown in FIG. 4B, in the fuel cell system 1 of the present embodiment, the OCV purge processing starts at the time t0. That is, anode gas and cathode gas starts to be supplied at the time t0 at the pressures PA2 and PC2, which are lower than the abovementioned pressures PA1 and PC1, respectively, and at the predetermined flow rate FC2 of cathode gas. This OCV purge processing is conducted until the time t2 when the total replacing amount reaches the predetermined value.

At this point, the OCV purge processing of the fuel cell system 1 of the present embodiment is compared with that of the comparative example.

As described above, in the present embodiment, pressures PA2 of anode gas and PC2 of cathode gas are lower than the pressures PA1 and PC1 of the comparative example, respectively. Accordingly, the concentration of anode off-gas in gas exhausted from the diluter does not exceed the predetermined upper limit of the exhaust concentration. In addition, lowering the pressures of anode gas and cathode gas as described above causes the time t2–t0 for OCV purge processing according to the present embodiment to be longer than the time t1–t0 for that according to the comparative example. However, in the fuel cell system 1 of the present embodiment, the OCV purge processing can be conducted without exceeding the upper limit of the exhaust concentration.

The present embodiment has the following advantages.

(1) According to the fuel cell system 1 of the present embodiment, in the case of performing low temperature startup on the fuel cell 10, the pressure of additional anode gas to be supplied from the supply device 20 to the fuel cell 10 decreases, and the total replacing amount of gas retained in the fuel cell 10 increases, as compared with the case of performing normal startup. In this way, the total replacing amount of gas increases in the case of performing low temperature startup on the fuel cell 10, as compared with the case of performing normal startup. This makes it possible to ensure power generation performance of the fuel cell 10 by using a reactive area effectively, for example, even if residual water freezes in the fuel cell 10, thereby decreasing the effective power generation area.

Figure 5:
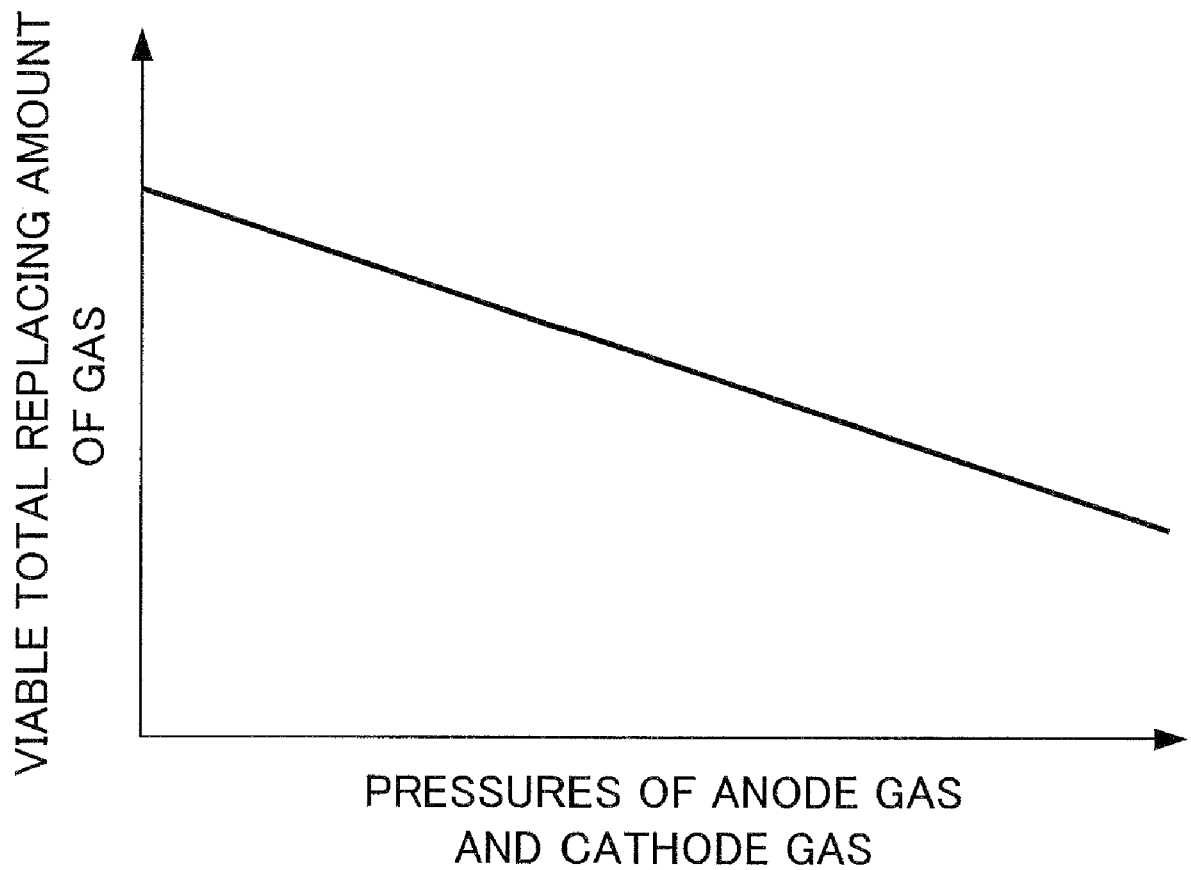
FIG. 5 is a diagram illustrating a relationship between the pressures of anode gas and cathode gas during OCV purge processing and the viable total replacing amount of gas.

FIG. 5 is a diagram illustrating a relationship between the pressures of anode gas and cathode gas during OCV purge processing and the viable total replacing amount of gas. Here, the viable total replacing amount of gas indicates the total replacing amount of gas viable while the exhaust concentration of anode off-gas is maintained to be lower than the abovementioned upper limit of the exhaust concentration during OCV purge processing.

As shown in FIG. 5, the viable total replacing amount of gas increases as the pressures of anode gas and cathode gas decreases because the concentration of anode off-gas in gas exhausted from the diluter can be reduced.

Accordingly, the total replacing amount of gas during OCV purge processing can be increased by decreasing the pressures of anode gas and cathode gas.

In addition, the amount of anode off-gas to be exhausted per a unit time can be reduced by increasing the total replacing amount of gas and decreasing the pressure of anode gas as described above. Accordingly, it is no longer necessary to increase the size of the diluter 50 according to the exhaust amount of anode off-gas during low temperature startup.

(2) According to the fuel cell system 1 of the present embodiment, the pressure of dilution gas to be introduced from the agitation gas inlet pipe 56 to the retention chamber 53 decreases in the case of performing low temperature startup on the fuel cell 10, as compared with the case of performing normal startup. This leads to a reduction in the flow per unit time of anode off-gas to be evacuated from the retention chamber 53 to the dilution gas pipe 57 or the concentration of anode off-gas in gas to be exhausted from the diluter 50.

In addition, the pressure in the retention chamber 53 can be reduced by reducing the pressure of dilution gas to be introduced into the retention chamber 53 through the agitation gas inlet pipe 56. As described above, the pressure of additional anode gas to be supplied decreases in the case of performing low temperature startup on the fuel cell 10, as compared with the case of performing normal startup. Reducing the pressure of anode gas in this way may cause difficulty in introducing anode off-gas discharged from the fuel cell 10 into the retention chamber 53. However, in the fuel cell system 1, anode off-gas can be introduced into the retention chamber 53 by reducing the pressure in the retention chamber 53, even if the pressure of additional anode gas to be supplied decreases. Accordingly, reducing the supply pressure of anode gas during low temperature startup can prevent the performance of the diluter 50 diluting anode off-gas from deteriorating.

In addition, electric power to be consumed by a means supplying this dilution gas, such as the air compressor 21 supplying cathode gas, can be reduced by reducing the pressure of dilution gas. Especially, since such replacing of anode gas is conducted when the fuel cell 10 starts, or before the fuel cell 10 starts electric power generation, electric power to be consumed by the air compressor 21 is supplied from a battery. Thus, according to the fuel cell system 1 of the present embodiment, by suppressing consumption of the battery power, unconsumed battery power can be used as electric power energy for operating other accessories such as an air conditioner and the like, and also a smaller and cheaper battery can be used.

Furthermore, the present invention is not limited to the abovementioned embodiments, and variations and modifications are included within the scope to achieve the object of the present invention.

In the fuel cell system 1 of the abovementioned embodiment, the temperature T of the fuel cell, which is detected by the fuel cell temperature sensor 11 provided in the fuel cell 10, is used for information regarding the temperature of the fuel cell 10, but not so as to be limited thereto. Instead of information regarding the temperature of the fuel cell, information regarding the system temperature of the fuel cell system, the outside temperature of a location where the fuel cell system is installed, and the weather forecast in a region where the fuel cell system is installed, may be used.

In addition, in the fuel cell system 1 of the abovementioned embodiment, the pressures of both anode gas and cathode gas during the OCV purge processing during low temperature startup is decreased, but only the pressure of the cathode gas may be decreased. This leads to the production of a similar effect to that provided from the fuel cell system 1 of the abovementioned embodiment.

What is claimed is:

1. A control method for controlling a fuel cell system, the fuel cell comprising: a fuel cell generating electric power by chemically reacting cathode gas with anode gas, a cathode gas supply unit supplying cathode gas to a cathode side of the fuel cell, and an anode gas supply unit supplying anode gas to an anode side of the fuel cell, wherein the control method comprises: a low temperature startup determination step for determining whether to perform low temperature startup or normal startup on the fuel cell based on information regarding the temperature of the fuel cell when starting up fuel cell, and an anode gas replacing step for replacing gas retained in the fuel cell by supplying additional anode gas from the anode gas supply unit to the anode side of the fuel cell, wherein in the anode gas replacing step, the pressure of additional anode gas to be supplied from the anode gas supply unit decreases, and the total replacing amount of gas retained in the fuel cell increases prior to the flow of a current in the fuel cell in a case of performing low temperature start up on the fuel cell, as compared with a case of performing normal startup on the fuel cell.

2. The control method according to claim 1, wherein the fuel cell system further comprises:
   a dilution unit diluting gas and then exhausting thereof by using gas containing at least one of cathode off-gas discharged from the fuel cell and cathode gas supplied from the cathode gas supply unit as dilution gas, wherein the dilution unit has a retention chamber temporarily retaining anode off-gas discharged from the fuel cell, an inlet pipe introducing dilution gas into the retention chamber, and a dilution gas pipe in which dilution gas circulates and a hole part is formed that intakes retained gas in the retention chamber; and
   in the anode gas replacing step, the pressure of the dilution gas to be supplied from the inlet pipe to the retention chamber reduces in a case of performing low temperature startup on the fuel cell, as compared with a case of performing normal startup on the fuel cell.

* * * * *